(12) United States Patent
Skeie et al.

(10) Patent No.: US 12,522,477 B2
(45) Date of Patent: Jan. 13, 2026

(54) HYDRAULIC CIRCUIT AND METHOD FOR A MATERIAL HANDLER

(71) Applicant: Brandt Industries Canada Ltd., Regina (CA)

(72) Inventors: Alexander Skeie, Regina (CA); Rick Copeland, Buena Vista (CA)

(73) Assignee: Brandt Industries Canada Ltd., Regina (CA)

( * ) Notice: Subject to any disclaimer, the term of this patent is extended or adjusted under 35 U.S.C. 154(b) by 614 days.

(21) Appl. No.: 17/974,003

(22) Filed: Oct. 26, 2022

(65) Prior Publication Data

US 2024/0140762 A1 May 2, 2024

(51) Int. Cl.
*G05B 19/416* (2006.01)
*B66C 13/20* (2006.01)
(Continued)

(52) U.S. Cl.
CPC .............. *B66C 13/20* (2013.01); *B66C 13/44* (2013.01); *B66C 23/82* (2013.01); *F15B 1/26* (2013.01); *F15B 13/044* (2013.01); *G05B 19/416* (2013.01); *G05D 16/2022* (2019.01); *G05D 16/2024* (2019.01); *G05D 16/204* (2013.01);
(Continued)

(58) Field of Classification Search
CPC ......... B66C 13/20; B66C 13/44; B66C 23/82; F15B 1/26; F15B 13/044; F15B 2211/30525; F15B 2211/327; F15B 2211/63; F15B 2211/3116; F15B 2211/50536; F15B 2211/526; F15B 11/028; G05B 19/416; G05B 2219/45006; G05D 16/2022; G05D 16/2024; G05D 16/204
See application file for complete search history.

(56) References Cited

U.S. PATENT DOCUMENTS

| | | |
|---|---|---|
| 4,445,541 A | 5/1984 | Schmiel |
| 5,353,686 A | 10/1994 | Nakamura |

(Continued)

FOREIGN PATENT DOCUMENTS

| | | | | |
|---|---|---|---|---|
| JP | H10185343 A | * | 7/1998 | |
| WO | WO-2005038268 A1 | * | 4/2005 | .......... F15B 13/0414 |

(Continued)

*Primary Examiner* — Santosh R Poudel
(74) *Attorney, Agent, or Firm* — Frost Brown Todd LLP

(57) ABSTRACT

A computer-implemented method and/or system for controlling a material handler comprises: processing, by an electronic control unit (ECU), a plurality of electronic input signals from at least one joystick; determining an adjustment for at least one of a pair of solenoids based on at least the plurality of electronic input signals from the joystick; controlling the pair of solenoids by the ECU and each solenoid acting in opposition to each of a pair of biasing elements of an open-center directional control valve to move the directional control valve to an extension position or a retraction position from a central position; determining a setpoint buildup pressure for a central passageway of the directional control valve; and actuating a constrictive solenoid of a pressure buildup valve to constrict the central passageway based on the setpoint buildup pressure whereby the constrictive passageway increases a pressure in the central passageway of the directional control valve.

9 Claims, 6 Drawing Sheets

(51) Int. Cl.
*B66C 13/44* (2006.01)
*B66C 23/82* (2006.01)
*F15B 1/26* (2006.01)
*F15B 13/044* (2006.01)
*G05D 16/20* (2006.01)

(52) U.S. Cl.
CPC ............... *F15B 2211/30525* (2013.01); *F15B 2211/327* (2013.01); *F15B 2211/63* (2013.01); *G05B 2219/45006* (2013.01)

(56) References Cited

U.S. PATENT DOCUMENTS

| | | | |
|---|---|---|---|
| 6,918,247 | B1 | 7/2005 | Warner |
| 7,434,391 | B2 | 10/2008 | Asam et al. |
| 7,819,195 | B2 | 10/2010 | Ellis |
| 8,418,451 | B2 | 4/2013 | Stanger et al. |
| 8,938,956 | B2 | 1/2015 | Asam et al. |
| 9,151,018 | B2 | 10/2015 | Knussman |
| 9,163,385 | B2 | 10/2015 | Lavergne et al. |
| 9,638,217 | B2 | 5/2017 | Yang |
| 9,791,015 | B2 | 10/2017 | Kloft et al. |
| 11,268,263 | B2 | 3/2022 | Wagner et al. |
| 2004/0025941 | A1* | 2/2004 | Wuerth ................. B60T 17/221 137/487.5 |
| 2006/0243128 | A1* | 11/2006 | Ma ........................ F15B 11/006 91/433 |
| 2007/0051100 | A1* | 3/2007 | Kauss .................... E02F 9/2207 60/413 |
| 2008/0142232 | A1* | 6/2008 | Palmer .................. E02F 9/2296 701/50 |
| 2011/0219744 | A1* | 9/2011 | Itoga ..................... E02F 9/2066 60/272 |
| 2021/0301499 | A1* | 9/2021 | Abell .................... E02F 9/2217 |

FOREIGN PATENT DOCUMENTS

| | | | |
|---|---|---|---|
| WO | WO 2010/049594 | 5/2010 | |
| WO | WO 2015/022054 | 2/2015 | |
| WO | WO-2016048773 A1 * | 3/2016 | ............. F04C 14/24 |
| WO | WO 2018/202419 | 11/2018 | |

* cited by examiner

HYDRAULIC CIRCUIT AND METHOD FOR A MATERIAL HANDLER

FIELD

This invention is in the field of hydraulic circuits and in particular to hydraulic circuits used in a material handler.

BACKGROUND

U.S. Pat. No. 4,445,541 discloses a joystick controller for remotely controlling hydraulic directional control valve and also for controlling a solenoid actuated pressure build-up valve. A light-emitting diode is carried in and by a handle of the joystick controller. A photosensitive transistor receives the light emitted from the light-emitting diode. When the handle moves off of a neutral position, a receptacle blocks the light from the photo-transistor. A fiber optic light conductor extends from the light-emitting diode toward the photo-transistor. The photo-transistor then actuates a relay switch which sends a control signal to a solenoid actuated pressure build-up valve, thereby providing a ready means for effectuating both the control of the hydraulic directional control valve and the pressure build-up valve solenoid with one controller.

U.S. Pat. No. 5,353,686 discloses a hydraulic circuit, having a four-position closed-center valve controlled by a proportional control valve, can facilitate the vertical position control and operating speed control of a blade with a simple structure, while providing that the floating condition of the blade can be precisely recognized by the position of a control lever. The spool of the four-position selector valve has a "hold" position which is given by the closed-center position. Opposite ends of the spool receive a pilot pressure from the pressure proportional control valve, one position being obtained by applying pilot pressure to a first end of the spool, and two positions being obtained by applying pilot pressure to the second end of the spool. One of the latter two positions is a "floating" position, while the other two positions are the "up" position and the "down" position. The control lever for the pressure proportional control valve can have a detent device for fixing the control lever at the "floating" position.

SUMMARY

According to an aspect, there is provided a control system for a material handler. The control system may have a joystick; an electronic control unit (ECU) receiving a plurality of electronic input signals from the joystick; and a hydraulic circuit hydraulically coupled to one or more hydraulic cylinders of the material handler.

The hydraulic circuit may have a directional control valve comprises a central position, an extension position, and a retraction position. The directional control valve may have a tank port, a pump port, a central passageway, and a pair of work ports. The directional control valve may have a pair of biasing elements, such as spring, maintaining the directional control valve in the central position. A pair of solenoids controlled by the ECU may act in opposition to each of the pair of biasing elements of the directional control valve to move the directional control valve to the extension position or the retraction position. The hydraulic cylinders may be coupled between the pair of work ports. A pump may be hydraulically coupled to the pump port and the central passageway. A tank may be hydraulically coupled to the tank port.

A pressure buildup valve may have a passthrough position and a constrictive position. The pressure buildup valve may have a constrictive passageway hydraulically coupled to the central passageway of the directional control valve. The pressure buildup valve may have a spring, or other biasing element, maintaining the pressure buildup valve in the passthrough position.

A constrictive solenoid may be controlled by the ECU and when activated causes the pressure building valve to move towards the constrictive position whereby the constrictive passageway increases pressure in the central passageway of the directional control valve.

The ECU may executing instructions from a tangible computer-readable medium to: process the plurality of electronic input signals from the joystick; determine an adjustment for at least one of the pair of solenoids based on at least the plurality of electronic input signals from the joystick; determine a setpoint buildup pressure for the central passageway; actuate the at least one of the pair of solenoids based on the adjustment; and actuate the constrictive solenoid of the pressure buildup valve based on the setpoint buildup pressure. The adjustment may be based on an activation range of the joystick. The activation range of the joystick may be adjusted from between 2-degrees to 5 degrees of movement. The activation range may be user selectable.

The directional control valve may comprises a four-port, three-position directional control valve. The pressure buildup valve may be selected from a four-port three-position directional control valve or a two-position two-way valve.

The ECU may execute a binary mode wherein the setpoint buildup pressure is either 0% or 100%. The ECU may execute an analog mode wherein the setpoint buildup pressure ranges from 0% to 100% of a maximum hydraulic circuit pressure. The ECU may execute in an operator selectable mode selected from at least one of: a binary mode, wherein the setpoint buildup pressure is either 0% or 100%, and an analog mode, wherein the setpoint buildup pressure ranges from 0% to 100% of a maximum hydraulic circuit pressure.

According to another aspect, there is provided a computer-implemented method for controlling a material handler. The method may involve the steps of: processing, by an electronic control unit (ECU), a plurality of electronic input signals from at least one joystick; determining an adjustment for at least one of a pair of solenoids based on at least the plurality of electronic input signals from the joystick; controlling the pair of solenoids by the ECU and each solenoid acting in opposition to each of a pair of biasing elements of a directional control valve to move the directional control valve to an extension position or a retraction position from a central position; determining a setpoint buildup pressure for a central passageway of the directional control valve; and actuating a constrictive solenoid of a pressure buildup valve to constrict the central passageway based on the setpoint buildup pressure whereby the constrictive passageway increases a pressure in the central passageway of the directional control valve.

The adjustment may be based on an activation range of the joystick. The activation range of the joystick may be adjusted from between 2-degrees to 5 degrees of movement. The activation range may be user selectable.

The computer-implemented method may execute in a binary mode wherein the setpoint buildup pressure is either 0% or 100%. The computer-implemented method may execute in an analog mode wherein the setpoint buildup pressure ranges from 0% to 100% of a maximum hydraulic circuit pressure. The computer-implemented method may involve selecting an operator selectable mode selected from at least one of: a binary mode, wherein the setpoint buildup pressure is either 0% or 100%, and an analog mode, wherein the setpoint buildup pressure ranges from 0% to 100% of a maximum hydraulic circuit pressure.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1A:
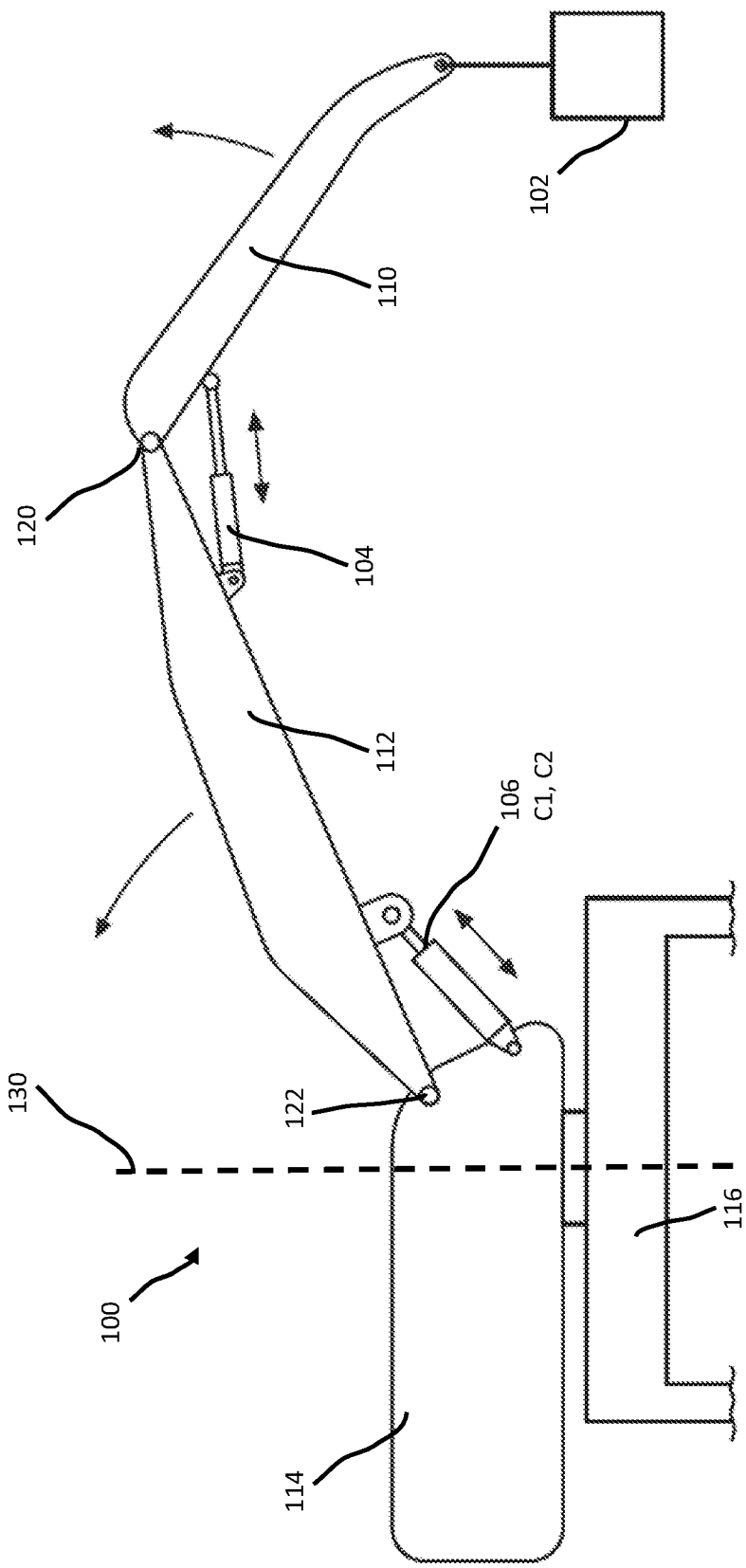
FIG. 1A is a side view of a material handler with an attachment at maximum reach and an arm fully extended.
Figure 1B:
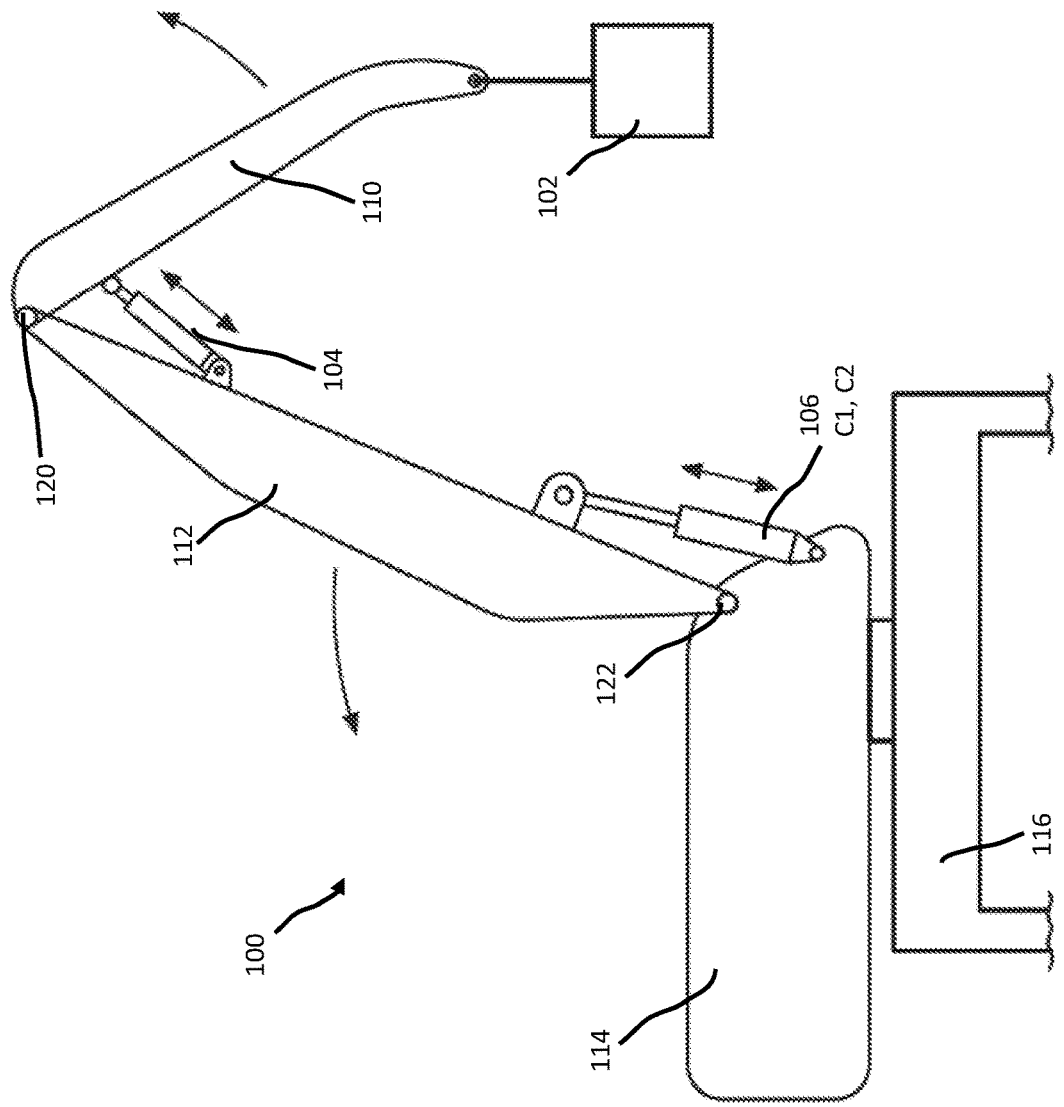
FIG. 1B is a side view of the material handler with the attachment close to the machine and the arm retracted.

Turning to FIGS. 1A and 1B, a material handler 100 may comprise an arm having an upper linkage 110 pivotally coupled to a lower linkage 112. In some aspects, the material handler 100 may be a converted excavator, such as by using a modular hydraulic thumb (not shown) as described in U.S. application Ser. No. 17/507,013, the content of which is explicitly incorporated by reference in its entirety. The upper linkage 110 may be extended or retracted with respect to the lower linkage 112 at a pivot 120 using an arm hydraulic cylinder 104. The lower linkage 112 may be pivotally coupled to a rotatable platform 114, which may comprise a cab for a vehicle operator. Likewise, the lower linkage may be extended or retracted with respect to the rotatable base 114 at pivot 122 using one or more boom hydraulic cylinders 106 (C1, C2). The rotatable platform 114 may rotate the entire arm about a vertical axis 130 shown particularly in FIG. 1A. The rotatable platform 114 may be coupled to a support platform 116, which may be mobile or fixed.

The material handler 100 may generally have a longer reach, when compared to the excavator, as shown in FIG. 1A and/or may need more stability during use. Particularly, a consistent movement during a high load or a low load and/or during a longer reach (e.g. FIG. 1A) or a shorter reach (e.g. FIG. 1B) may be advantageous for the material handler 100 as the material handler 100 typically performs pick and place tasks. The excavator may have open-center hydraulics to achieve consistent force and/or pressure; however, the excavator may not provide the consistent movement for the material handler 100. A movement of the excavator may typically be controlled with a pair of joysticks 202 such that, with different amounts of resistance, the joystick 202 may have to be moved further initially to generate enough force to start movement. This start movement may be undesirable in pick and place tasks using the material handler 100 as the motion may cause the arm to jerk resulting in the machine 100 and/or operator shaking the held load 102 to be dropped. The start movement may also hinder precision placement of the load 102. As described herein, the methods and/or systems may provide the consistent movement for the material handler 100 based on a consistent movement of the joystick 202.

Figure 2:
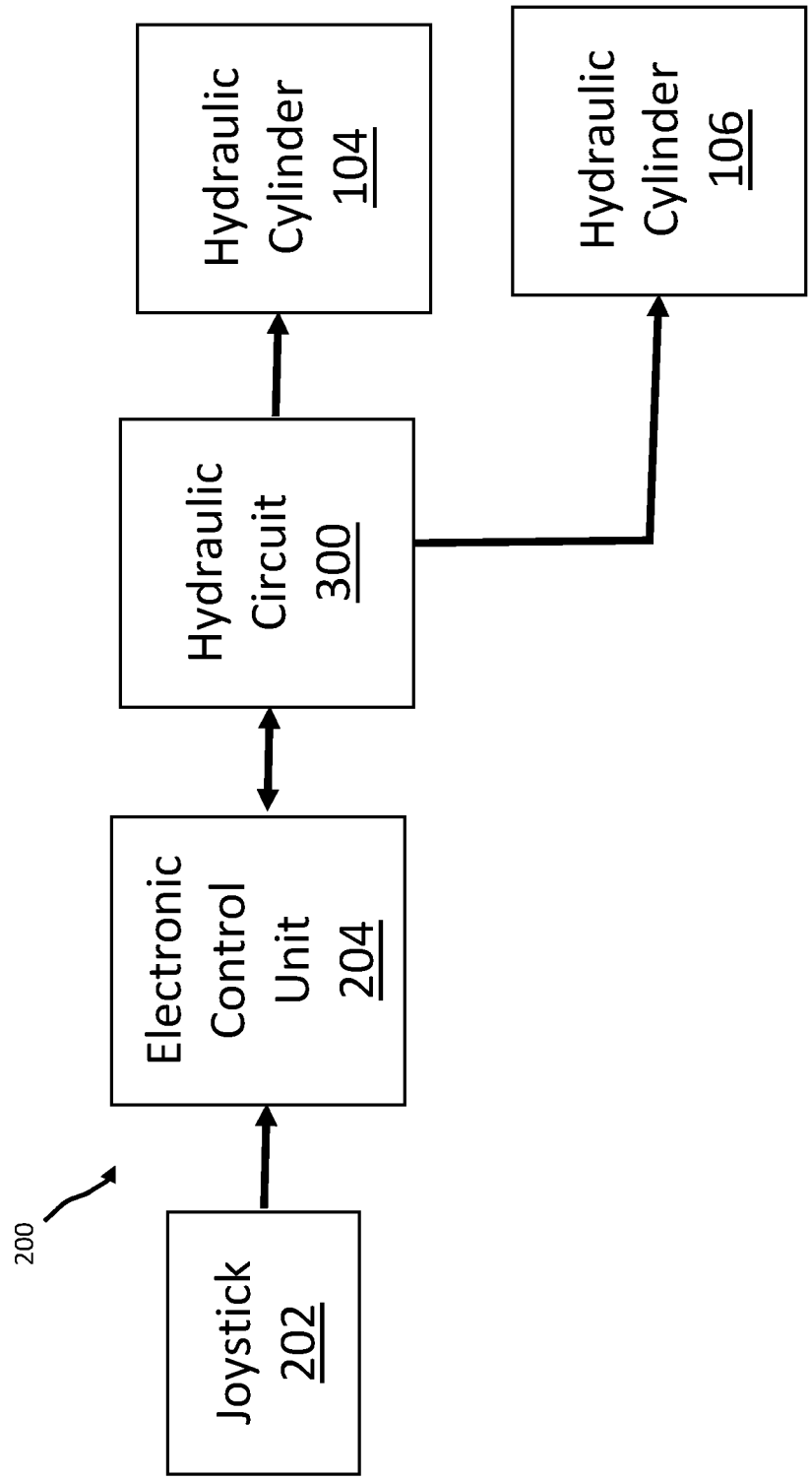
FIG. 2 is a block diagram of a control system for the material handler.

Turning to FIG. 2, a control system 200 for the material handler 100 may comprise a joystick 202 providing one or more electronic input signals to an electronic control unit (ECU) 204 or a programmable logic controller (PLC) executing one or more instructions from a tangible computer-readable medium. When an operator of the material handler 100 performs an action on the joystick 202, the ECU 204 may receive the corresponding electronic input signals transmitted by the joystick 202 and processes the electronic input signals in order to activate one or more solenoids for one or more work ports WPA, WPB of one or more hydraulic circuits 300. The ECU 204 may also activate one or more solenoids for a pressure buildup valve V2, and control a flow output of a pump 304.

Figure 3:
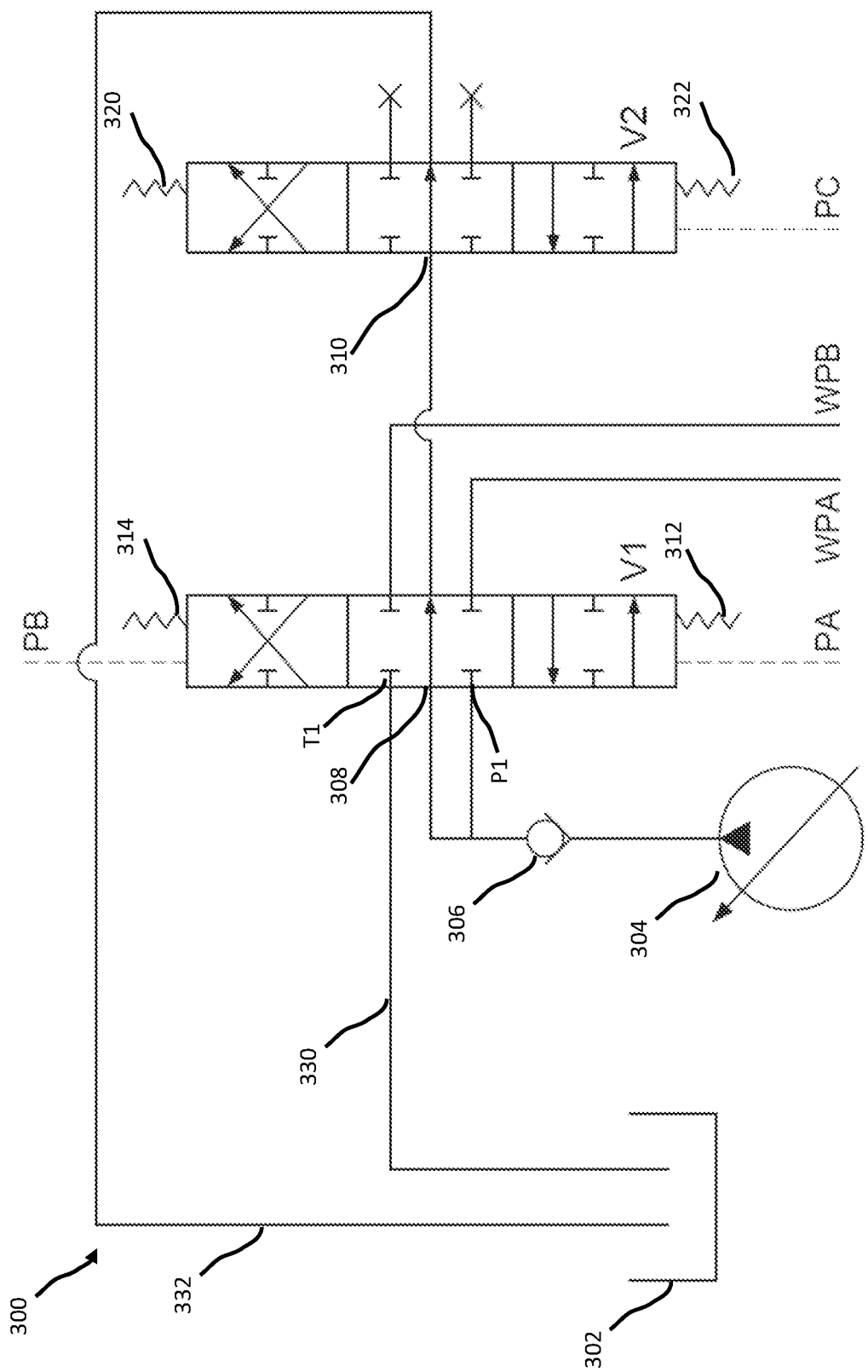
FIG. 3 is a hydraulic circuit for controlling a buildup pressure to actuate work ports for one function with consistent thresholds regardless of the work port pressure.

With reference to FIG. 3, a hydraulic circuit 300 for providing the consistent movement may comprise a first directional control valve V1 (e.g. a pilot valve V1) and a second directional control valve V2. The second directional control valve V2 may also be known as a pressure buildup valve V2 and may be a two-position two-way valve to restrict the open center flow (instead of the pictured three-position, six-way valve). In this aspect, the pair of directional control valves V1, V2 may each or both comprise a four-port three-position directional control valve. The aspect demonstrated in FIG. 3 omits one or more relief valves for relieving the work ports WPA, WPB and portions of the main circuit to improve clarity of the drawing.

A pair of compressing biasing elements (e.g. springs) 312, 314 may maintain the valve V1 in a central position when a pair of pilot lines PA and PB are not active or are in equilibrium. The central position may correspond to when the joystick 202 is in a neutral position. A hydraulic pump 304 may provide hydraulic fluid from a hydraulic reservoir 302 to a pump port P1 of the first directional control valve V1 via a check valve 306. The tank port T1 of the pilot valve V1 may return hydraulic fluid from one of the work ports WPA, WPB to the hydraulic reservoir 302 via a tank path 330.

When in the central position, the valve V1 closes off work ports WPA and WPB and maintains one or more of the hydraulic cylinders 104, 106 in a neutral or static position. The hydraulic pump 304 may also provide hydraulic fluid from the hydraulic reservoir 302 to a central passageway or port 308 through the pilot valve V1 via the check valve 306. The central passageway 308 also passes through a constrictive passageway 310 of the pressure buildup valve V2. When the valve V1 is in the central position and valve V2 is in the central position, the pump 304 provides a continuous flow through the central passageway 308 of valve V1 and valve V2 back to the hydraulic reservoir 302 via a return path 332 with a minimal restriction and/or pressure reduction between the pump input 308 and the return line 332 back to the tank 302.

When the ECU 204 activates the pilot line PA, an actuator or solenoid (not shown) acting in opposition to the spring 312 may cause the valve V1 to provide hydraulic fluid from the pump port P1 to the work port WPA, which may actuates one or more of the hydraulic cylinders 104, 106 to extend in one direction. The direction may correspond to a direction the joystick 202 is actuated. As the hydraulic cylinder(s) 104, 106 moves in one direction, a tank port T1 of the pilot valve V1 may return hydraulic fluid from the work port WPB to the hydraulic reservoir 302 via tank path 330.

When the ECU 204 activates the pilot line PB, an actuator or solenoid (not shown) acting in opposition to the spring 314 may cause the valve V1 provides hydraulic fluid from the pump port P1 to the work port WPB, which may actuate one or more of the hydraulic cylinders 104, 106 to retract in an opposite direction. The opposite direction may correspond to an opposite direction the joystick 202 is actuated. As the hydraulic cylinder(s) 104, 106 moves in opposite direction, the tank port T1 of the pilot valve V1 may return hydraulic fluid from the work port WPA to the hydraulic reservoir 302 via the tank path 330.

An arm position (e.g. the front's reach and/or the attachment weight) may impact how the load 102 affects the work ports WPA, WPB of the hydraulic cylinders 104, 106. As shown in FIG. 1A, the hydraulic cylinders 104, 106 may have work ports WPA, WPB under a heavy load or pressure when extending cylinders 106, 104 to move the linkages 110, 112 in an upward direction. Conversely as shown in FIG. 1B, the hydraulic cylinders 104, 106 may have work ports WPA, WPB under a light load when moving in the upward direction.

When the central pressure of the valve V1 is to be increased, the ECU 204 may provide an electronic signal to pilot line PC to activate a constrictive solenoid of the pressure buildup valve V2. Activation of the pilot line PC may cause the valve V2 to enter a constrictive position whereby the valve V2 constricts and/or closes the fluid flow through the constrictive passageway 310 of the valve V2 resulting in an increased central pressure within the valve V1 and/or to increase a relief valve pressure of valve V1 (e.g. valve V2 may provide another relief path other than a relief valve (not shown) between the work port WPB and the return path 332 and/or a relief valve (not shown) between the work port WPA and the return path 332). The increased central pressure means more pressure P1 is available to be provided to the work ports WPA and WPB with a minimal PA/PB pressure. The cylinders 104, 106 may move with a minimum joystick movement and a pilot (PA/PB) pressure when the hydraulic cylinder(s) 104, 106 are under a heavy load 102 and/or the arm is fully extended under the load 102, such as shown in FIG. 1A. In any event, the hydraulic circuit 300 may have a main relief valve (not shown) between the central passageway 308 and the return path 332 preventing a system pressure from exceeding a maximum pump pressure (e.g. 5000 PSI). The maximum pressure may be set at a level in order to prevent damage to the hydraulic system.

When the central pressure of the valve V1 is to be decreased, the ECU 204 may reduce the electronic signal to pilot line PC to reduce actuation of the constrictive solenoid of the pressure buildup valve V2. This reduced actuation may cause the springs 320, 322 of the buildup pressure valve V2 to return to a passthrough position where the hydraulic fluid may freely flow through the buildup valve V2. This passthrough position may allow the oil to not overheat when functions are not in use. As a result, the valve V1 has a reduced central pressure within the valve V1 in order to make the flowrate to work port WPA or work port WPB more sensitive to the pressures at the work port WPA or the work port WPB when the hydraulic cylinders 104, 106 are under a low or no load 102 and/or the arm is fully contracted, such as shown in FIG. 1B.

Figure 4:
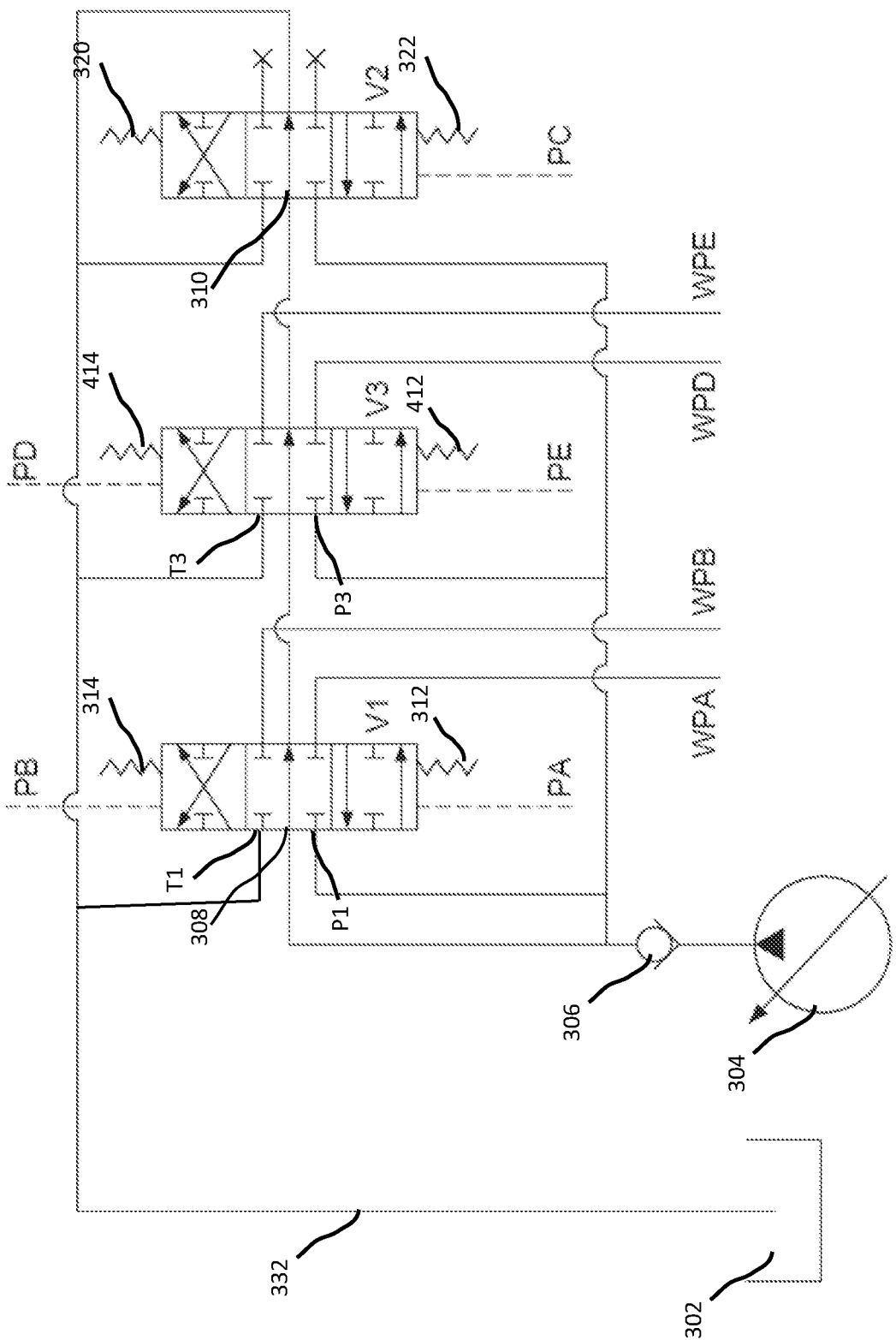
FIG. 4 is another hydraulic circuit demonstrating controlling the buildup pressure with a pair of valves; and actuating work ports for two functions with consistent thresholds regardless of work port pressure.

Turning to FIG. 4, a hydraulic circuit 400 for providing the consistent movement may comprise a first directional control valve V1 (e.g. a pilot valve V1), a second directional control valve V2, and a third directional control valve V3 (e.g. pilot valve V3). As previously described, the second directional control valve V2 may also be known as a pressure buildup valve V2. Other aspects may have the pressure buildup valve V2 be a proportional two-position, two-way valve. In this aspect, the three directional control valves V1, V2, V3 may each or both comprise a four-port, three-position directional control valve. The valves V1 and V2 operate in a similar function as described with reference to FIG. 3 above. In this aspect, the buildup pressure may be provided to the valve V1 as well as the valve V3.

A pair of compressing springs 412, 414 may maintain the valve V3 in a central position when a pair of pilot lines PD and PE are not active or are in equilibrium. The hydraulic pump 304 may provide hydraulic fluid from the hydraulic reservoir 302 to a pump port P3 of the directional control valve V3 via the check valve 306. The tank port T3 of the pilot valve V3 may return hydraulic fluid from one of the work ports WPD, WPE to the hydraulic reservoir 302 via the tank path 330.

When in the central position, the valve V3 closes off work ports WPD and WPE and maintains the hydraulic cylinder 106 in a neutral or static position. The hydraulic pump 304 may also provide hydraulic fluid from the hydraulic reservoir 302 to the central passageway 308 through the pilot valve V3 via the check valve 306. The central passageway 308 also passes through the constrictive passageway 310 of pressure buildup valve V2. When the valves V1, V3 are in the central position and valve V2 is in the central position, the pump 304 provides a continuous flow through the central passageway 308 of valves V1, V3, and valve V2 back to the hydraulic reservoir 302 via the return path 332.

When the ECU 204 activates the pilot line PE, the valve V1 provides hydraulic fluid from the pump port P3 to the work port WPE, which actuates the hydraulic cylinder 106 in one direction. As the hydraulic cylinder 106 moves in one direction, a tank port T3 of the pilot valve V3 may return hydraulic fluid from the work port WPD to the hydraulic reservoir 302 via the tank path 330.

When the ECU 204 activates the pilot line PD, the valve V3 provides hydraulic fluid from the pump port P3 to the work port WPD, which actuates the hydraulic cylinder 106 in an opposite direction. As the hydraulic cylinder 106 moves in opposite direction, the tank port T3 of the pilot valve V3 may return hydraulic fluid from the work port WPE to the hydraulic reservoir 302 via the tank path 330.

The front reach may impact how the load 102 affects the work ports WPA, WPB, WPD, WPE of their respective hydraulic cylinders 104, 106. As shown in FIG. 1A, the hydraulic cylinders 104, 106 may have work ports WPA, WPB, WPD, WPE under a heavy load or pressure when moving the linkages 110, 112 in an upward direction. Conversely as shown in FIG. 1B, the hydraulic cylinders 104, 106 may have work ports WPA, WPB, WPD, WPE under a light load when moving in the upward direction.

When the central pressure of the valves V1, V3 are to be increased, the ECU 204 may provide an electronic signal to pilot line PC to activate a solenoid of the pressure buildup valve V2. Activation of the pilot line PC constricts and/or closes the fluid flow through the central passageway 308 of the valves V1, V3, and the valve V2 resulting in an increased central pressure within the valves V1, V3. The increased central pressure means more pressure P1 may be available to the work ports WPA and WPB with the minimal PA/PB pressure. The cylinders 104, 106 may move with the minimum joystick movement and the pilot (PA/PB) pressure when activating cylinders 104, 106, when the hydraulic cylinder(s) 104, 106 are under a heavy load 102 and/or the arm is fully extended under the load 102, such as shown in FIG. 1A.

Although not depicted, each work port WPA, WPB, WPD, WPE may be coupled to relief valves connecting each work port WPA, WPB, WPD, WPE, to the tank 302 with a customizable pressure drop. The relief valves limit the maximum pressure that reaches the cylinders 104, 106 coupled to the work ports WPA, WPB, WPD, WPE. An effective individual metering of speed with multiple functions may be accomplished regardless the work port pressure or what other functions are active. The rest of the oil flow from the pump 304 may be sent over a main relief connecting between the check valve 306 output to the return path 332 with a 5000 PSI pressure drop.

When the central pressure of the valves V1, V3 are to be decreased, the ECU 204 may reduce the electronic signal to pilot line PC to deactivate the solenoid of the pressure buildup valve V2. This deactivation causes the springs 320, 322 of the buildup pressure valve V2 to return to a central position where the hydraulic fluid may freely flow through the buildup valve V2. As a result, the valves V1, V3 have a reduced central pressure within the valves V1, V3 in order to make the flowrate to the work ports WPA, WPB, WPD, WPE more sensitive to the pressures at the work ports WPA, WPB, WPD, WPE when the hydraulic cylinders 104, 106 are under a low or no load 102 and/or the arm is fully contracted, such as shown in FIG. 1B.

According to the aspects herein, the control of the buildup valve V2 by the ECU 204 provides consistent pilot pressure thresholds regardless of the pressures on the work ports WPA, WPB, WPD, WPE caused by the load 102. In this manner, the buildup valve V2 may provide independent control of the pump pressure and the valve V1, V3 position. When the ECU 204 actuates one of (or both) the valves V1, V3, the ECU 204 may also actuate the pressure buildup valve V2 simultaneously with valve V1, V3. In some aspects, the pressure buildup valve V2 may be actuated more or less depending on the valve V1, V3 being actuated. In this manner, the valve V1 may be provided with more instantaneous pressure buildup than the valve V3 (or vice versa).

Figure 5:
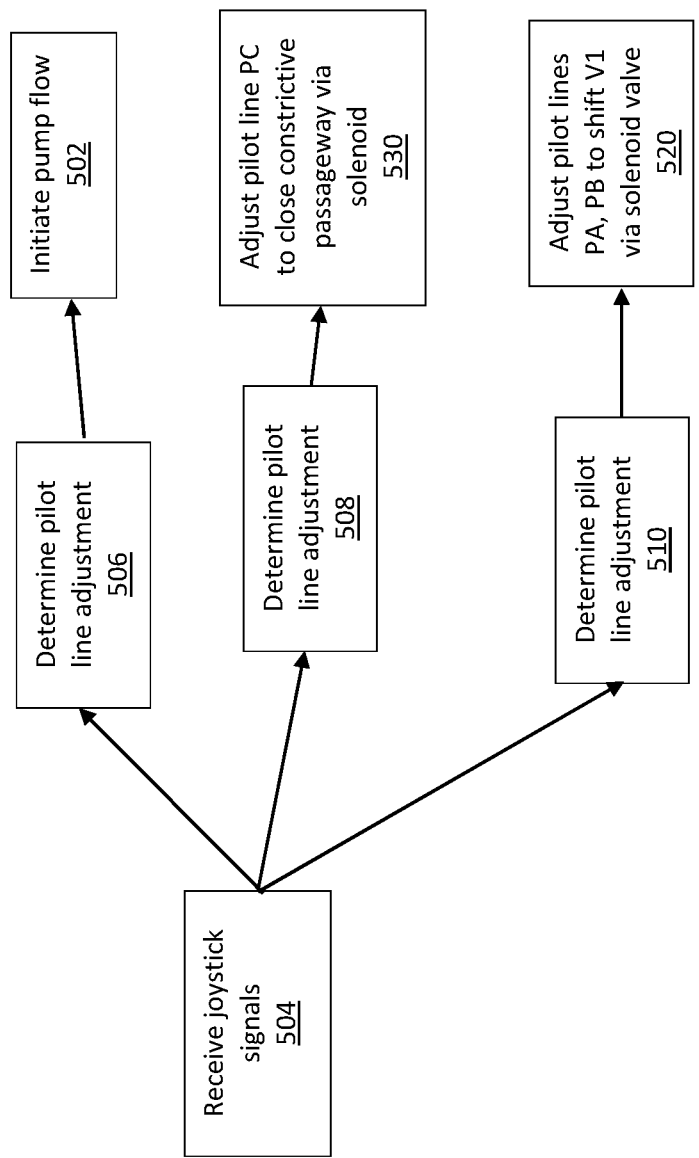
FIG. 5 is a control flow chart for controlling the buildup pressure to actuate work ports with consistent thresholds regardless of work port pressure.

Turning to FIG. 5, the ECU 204 may receive joystick signals at step 504. In response, the ECU 204 may execute at least one pilot line adjustment step 506, 508, 510. For instance, the ECU 204 may determine a pump pilot line adjustment at step 506 and initiate pump flow and initiate pilot lines PA, PB at step 502 in response to the pump pilot line adjustment. The ECU 204 may determine an adjustment for the buildup valve pilot line PC at step 508, which in turn adjusts the pilot line PC to close the constrictive passageway 310 at step 530 using the solenoid based, at least in part, on a machine type and/or an operator/technician adjustment. For example, the pressure setpoint may be 2500 PSI, which causes the pressure buildup valve V2 to reach 2500 PSI when at least one of the valves V1, V3 are active. The ECU 204 may also determine pilot line adjustment for the pilot lines at step 510, which in turn adjusts the pilot lines PA, PB to shift valve V1 via a solenoid valve at step 520. According to this aspect, any of steps 506, 508, 810, 502, 530, 520 may be executed in parallel and/or series in response to the ECU 204 receiving signals from the joystick 202.

As the ECU 204 may be programmed to control the constrictive passageway 310 according to the machine type, the ECU 204 may retrieve a setpoint pressure from a lookup table stored on the tangible computer-readable medium for adjusting the pressure of the central passageway 308. In some aspects, a user interface may be presented on a display allowing the technician or operator to select the machine type from a list of supported machines. In some aspects, the user interface may also present one or more customization adjustments for the setpoint pressure. This mode may provide for a moderate amount of movement sensitivity, and a moderate amount of pressure sensitivity when moving the joystick 202.

In some aspects, the constrictive passageway 310 may operate in a binary mode. In the binary mode, the ECU 204 may instruct the buildup valve pilot line PC to be either 0% of the maximum hydraulic circuit pressure or 100% of the maximum buildup pressure. This binary mode may provide for a maximum movement sensitivity regardless of pressure when moving the joystick 202.

In another aspect, the constrictive passageway 310 may operate in an analog mode. In the analog mode, the ECU 204 may instruct the buildup valve pilot line PC to provide a range of between 0% and 100% of the maximum hydraulic circuit pressure. The analog mode may provide some initial movement, but not a full force of the hydraulic cylinders 104, 106. For example, when lifting a portion of debris from a pile of debris, the portion of debris may be initially stuck in the pile. If the binary mode is used, the full force may be applied resulting in the portion of debris breaking away suddenly and may create a hazard as the portion of the debris may become airborne. Conversely, in the analog mode, the buildup valve pilot line PC may be limited to, for example, 25% of the maximum hydraulic circuit pressure and therefore, a lesser force may be used in order to remove the portion of the debris from the pile. In some aspects, the user interface may provide settings in order for the operator to instruct the ECU 204 to switch between the binary mode and the analog mode.

In yet another aspect, the ECU 204 may be configured to swap joysticks 202 for left/right operation without reconfiguration of the physical hardware. In this aspect, the user interface may provide settings for the operator to instruct the ECU 204 to swap controls to pilot lines PA and PE, and swap controls to pilot lines PB and PD.

According to some aspects, an activation range of the joystick 202 may be adjusted from between 2-degrees to 5-degrees of movement via adjusting an input variable of a control algorithm executing on the ECU 204. In some aspects, the operator may adjust this input variable using a user interface presented on a display. This input variable changes the buildup pressure to a custom value via valve V2 when valve V1 or valve V3 are actuated (for example a material handler boom 112 or arm 110). In some aspects, a different buildup pressure may be selected for forward/reverse movement of the joysticks 202 to move the upper linkage 110 or the boom 112 and/or left/right movements of the joystick 202 to rotate the upper house 114 with respect to the undercarriage 116.

In some aspects, particularly for the upper linkage 110, the setpoint pressure for the buildup pressure may be reduced when the upper linkage 110 is in a close position (e.g. FIG. 1B) and the setpoint pressure for the buildup pressure may be increased when the upper linkage 110 is an extended position (e.g. FIG. 1A). Varying the setpoint pressure based on the position of the upper linkage 110 may be accomplished by the ECU 204 adjusting the pilot line PC between 0% and 100% of the maximum hydraulic circuit pressure. When the upper linkage 110 is in the close position, a majority of the movement control may be based on restricting the return flow to the tank 302 when the arm 110 is extended and when the arm hydraulic cylinder 104 is being retracted due to gravity. In a particular example, the arm hydraulic cylinder 104 may have a tail end around 2.5 times an area of a rod end meaning that there is 2.5 times more fluid leaving the tail end than fluid entering the rod end. Most of the control (e.g. a sensitivity of the joystick 202) may be accomplished by restricting the return flow from the work port WPA (e.g. cylinder tail end) heading back to the tank 302. Very little of the control is accomplished by forcing oil at the buildup pressure to work port WPB (e.g. cylinder rod end) and doing so may end up heating the oil via an unnecessary pressure drop.

In another aspect, particularly with the boom 112, the setpoint pressure for the buildup pressure may be asymmetric (e.g. different in both outward motion and inward motion) due to a high variability with the position of the upper linkage 110 to guarantee a consistent threshold for a start of movement with different positions. For example, when the boom 112 is fully raised (e.g. FIG. 1A) and the boom 112 is being lowered, the buildup pressure on the rod end may be needed to start movement. When the boom 112 is lower in position and being lowered, all of the speed control may occur via restricting flow to the tank 302.

In another aspect, rotating the upper house 114 may not cause the buildup valve V2 to activate when the material handler 100 is on flat surfaces as the movement may be consistent over the range of positions. When the material handler 100 is on an incline, the buildup pressure valve V2 may be active due to the variance in pressure needed to start rotation of the upper house 114.

Although the aspects described herein demonstrate an arm with two linkages 110, 112 with two hydraulic cylinders 104, 106, other aspects may have more linkages and hydraulic cylinders.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A control system for a material handler comprising:
   a joystick;
   an electronic control unit (ECU) receiving a plurality of electronic input signals from the joystick;
   a hydraulic circuit hydraulically coupled to at least one hydraulic cylinder of the material handler, the hydraulic circuit comprises:
   a directional control valve comprises a central position, an extension position, and a retraction position; the directional control valve comprises a tank port, a pump port, a central passageway, and a pair of work ports; the directional control valve comprises a pair of biasing elements maintaining the directional control valve in the central position;
   a pair of solenoids controlled by the ECU and each solenoid acting in opposition to each of the pair of biasing elements of the directional control valve to move the directional control valve to the extension position or the retraction position;
   the at least one hydraulic cylinder coupled between the pair of work ports;
   a pump hydraulically coupled to the pump port and the central passageway;
   a tank hydraulically coupled to the tank port;

a pressure buildup valve comprises a passthrough position and a constrictive position; the pressure buildup valve comprises a constrictive passageway hydraulically coupled to the central passageway of the directional control valve; the pressure buildup valve comprises a spring maintaining the pressure buildup valve in the passthrough position;

a constrictive solenoid controlled by the ECU and when activated causes the pressure building valve to move towards the constrictive position whereby the constrictive passageway increases pressure in the central passageway of the directional control valve;

the ECU executing instructions from a tangible computer-readable medium to:
process the plurality of electronic input signals from the joystick;
determine an adjustment for at least one of the pair of solenoids based on at least the plurality of electronic input signals from the joystick;
determine a setpoint buildup pressure for the central passageway;
actuate the at least one of the pair of solenoids based on the adjustment; and
actuate the constrictive solenoid of the pressure buildup valve based on the setpoint buildup pressure.

2. The control system according to claim 1, wherein the directional control valve comprises a four-port, three-position directional control valve.

3. The control system according to claim 1, wherein the pressure buildup valve is selected from a four-port three-position directional control valve or a two-position two-way valve.

4. The control system according to claim 1, wherein the adjustment is based on an activation range of the joystick.

5. The control system according to claim 4, wherein the activation range of the joystick is adjusted from between 2-degrees to 5 degrees of movement.

6. The control system according to claim 5, wherein the activation range is user selectable.

7. The control system according to claim 1, wherein the ECU executes a binary mode wherein the setpoint buildup pressure is either 0% or 100%.

8. The control system according to claim 1, wherein the ECU executes an analog mode wherein the setpoint buildup pressure ranges from 0% to 100% of a maximum hydraulic circuit pressure.

9. The control system according to claim 1, wherein the ECU executes in an operator selectable mode selected from at least one of: a binary mode, wherein the setpoint buildup pressure is either 0% or 100%, and an analog mode, wherein the setpoint buildup pressure ranges from 0% to 100% of a maximum hydraulic circuit pressure.

* * * * *